May 5, 1959   J. MÜLLER   2,884,804
TRANSMITTING MECHANISM
Filed Nov. 3, 1953
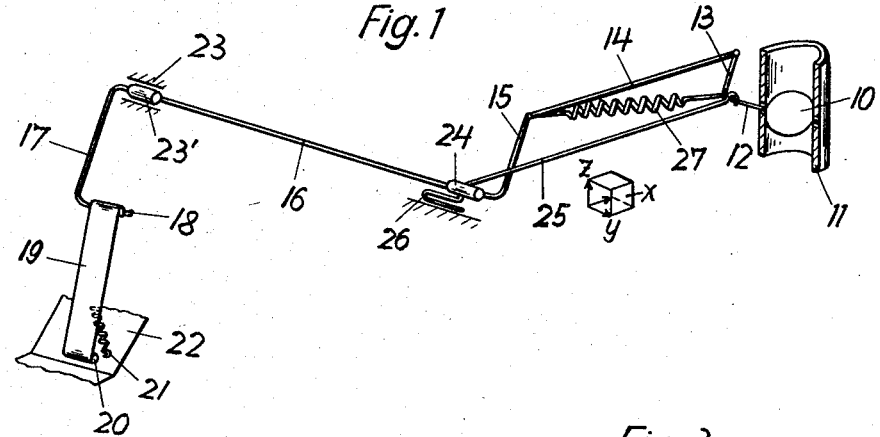
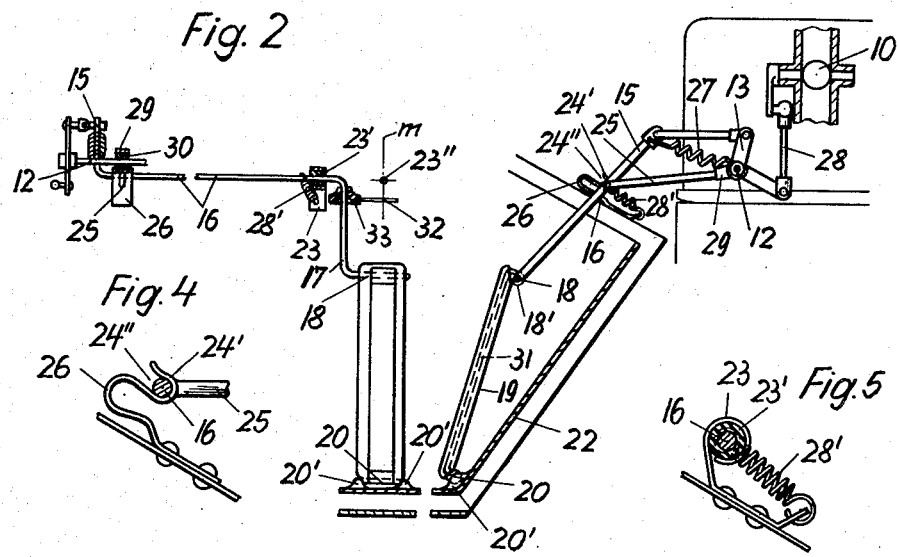
INVENTOR
JOSEF MÜLLER
BY Dicks and Craig
ATTORNEYS

United States Patent Office 2,884,804
Patented May 5, 1959

2,884,804

TRANSMITTING MECHANISM

Josef Müller, Stuttgart, Germany, assignor to Daimler-Benz Aktiengesellschaft, Stuttgart-Unterturkheim, Germany Application November 3, 1953, Serial No. 389,929

Claims priority, application Germany November 4, 1952

10 Claims. (Cl. 74—513)

The present invention relates to a mechanism for transmitting a positive control or actuating movement from a relatively stationary point to a strongly vibrating point. More particularly, the invention relates to a mechanism for controlling the operation of resiliently mounted engines of automobiles and similar vehicles.

Resiliently mounted automobile engines usually have the disadvantage that the control rods which are operated by the driver from the inside of the car are strongly affected by the movements of the engine. The more softly and elastically the engine is mounted, the stronger are its vibrations which are especially transmitted through the respective connecting or control rods to the accelerator pedal, resulting in a constant very annoying tapping of the pedal on the sole of the driver's foot, or in a continuous opening and closing of the throttle, or both.

Efforts have been made by the prior art to absorb or cushion these vibrations by the insertion of elastic connections. However, such connections, if of sufficient resiliency, prevent a proper positive transmission of movement from one rod member to the other, and thus render a safe control and operation of the car impossible. If, on the other hand, the connections between the individual rod members were made relatively rigid, the vitrations and knocking of the pedal could not be avoided.

It is therefore the principal object of the present invention to provide a control rod mechanism which permits a proper positive and safe control movement, and also prevents even the strongest relative vibrations between the engine and the car body from being transmitted to the accelerator pedal or other actuating member.

A feature of the invention thus consists in the provision of means for connecting the respective control element of the engine, for example, the throttle, with its respective actuating handle or pedal within the car in such a manner that the vibrations of the engine are taken up and absorbed by such connecting means so that an actuating movement of such handle or pedal is positively transmitted to the respective control element, and such control element as well as such handle or pedal are unaffected by the engine vibrations.

More specific features of the invention are to provide a relatively long control or connecting rod which terminates at each end in an angular lever, to connect such levers to the actuating handle or pedal at the inside of the car and to the engine control element, for example, the throttle, respectively, to mount one bearing of the control rod substantially rigidly on the car body at a point near the lever which is connected to the actuating handle or pedal, and further to provide a resilient mounting for the control rod near the other lever which is connected to the throttle or other control element, and to secure such resilient mounting in such a manner to the car body as well as to the throttle or other control element that the vibrations thereof are transmitted to and absorbed by such resilient mounting. Thus, the relative movements between the engine and the car body no longer affect the control rod to which the new type of mounting is applied or the actuating movements thereof, especially if the substantially rigidly secured bearing of the control rod is mounted in substantially the same vertical plane with the movement of the actuating handle or pedal, for example, the gas pedal of the car. The knocking of the gas pedal or other actuating member as well as the undesirable reciprocating movement or fluttering of the respective control element of the engine, for example, the butterfly valve of the throttle, are thus avoided.

Further objects, features, and advantages of the invention will appear from the following detailed description thereof and the appended drawings, in which Fig. 1 is a diagrammatic perspective illustration of the connecting rod structure according to the invention;

Fig. 2 shows a rear view of the same mechanism;

Fig. 3 shows a side view thereof;

Figs. 4 and 5 are detail views of the two bearings according to the invention for supporting the connecting rod shown in Figs. 2 and 3; while Figs. 6 and 7 show modifications of the resilient bearing shown in Fig. 4.

In Fig. 1, the butterfly valve or throttle 10 in the intake pipe of an automobile engine constituting a control element for controlling the operation of the engine has on its shaft 12 a lever 13 which is connected by a connecting rod 14 with an angular lever 15 at one end of a rod or connecting member 16, which extends substantially at a right angle to the connecting rod 14. The other end of the rod or connecting member 16 is bent at an angle to form a crank or lever 17 which is hinged at the upper end 18 of a suitable plate 19 serving as a gas pedal to actuate the throttle 10. This gas pedal 19 is also pivotally and slidably supported in a suitable manner at the floorboard of the car at 20. A spring 21 tends to retain the pedal 19 in contact with the floorboard of the car or a plate 22 secured thereto. The crank 17 will be referred to hereinafter as the first lever, the arm or lever 15 as the second lever and the arm 13 as the third lever.

The straight portion 16 of the connecting rod or member is supported near one end, and substantially in a vertical plane with the gas pedal 19, by a suitable elastic bearing 23 which may, for example, include a rubber socket 23′. At the other end, the rod 16 is supported by a bearing 24 which is resiliently secured to the shaft 12 of the throttle 10 by a bracing rod 25, as well as relative to the body of the car by a suitable spring 26, for example, an S-shaped plate spring which may be soldered or otherwise secured to the rod 25, and shaped as well as mounted on a suitable part of the car body so as to afford its greatest resilience in the direction of the bracing rod 25. A retraction spring 27 tends to retain the valve 10 in a closed position as well as the pedal 19 in a retracted position.

When the driver depresses the gas pedal 19, the two-armed lever 15, 16, 17 turns in a counter-clockwise direction about the axis of the straight portion 16 and transmits such movement to the rod 14 to open the valve 10. The lower end of the gas pedal 19 may during this time slide on the floorboard or the plate 22 thereon.

Vibrations of the motor or of the intake pipe 11 in the direction shown by the arrows y or z merely result in a pivoting movement of the rods 14 and 25 about their left ends without affecting the position of the valve 10 and without transmitting the vibrations of the engine to the gas pedal 19. If, however, the bearing 24 were rigidly mounted on the car body without being braced by the rod 25, vibrations of the motor in the direction shown by the arrow x would continuously produce a fluttering of the valve 10 since such movement would cause a pivoting of the levers 13 and 15 about their respective axes. Thus, the valve 10 would constantly open and close to an extent depending upon the type of resilient mounting of the engine and the speed thereof. Obviously, such continuous reciprocating movement of the levers 13 and 15 would also be transmitted to the gas pedal 19 which would either transmit such annoying and tiresome vibrations to the driver's body or constantly pound upon the sole of his foot.

With the new and inventive support of the bearing 24, however, the vibrations of the engine and the valve shaft 12 in the direction of the arrow $x$ result in a reciprocating movement of the bearing 24 in that same direction against the action of the curved plate spring 26 and about a vertical pivoting axis at the bearing 23. Since this pivoting point of 23 is located in the same vertical plane with the direction of movement of the gas pedal 19, the lever 17 and its hinged end 18 remain practically unaffected by any movements of the engine, the valve 10, and the rods 14 and 25 in the direction of the arrow $x$. Thus, these movements are not transmitted to the gas pedal 19, and, on the other hand, they do not effect any pivoting of the valve shaft 12 and a resulting fluttering of the valve 10 since they are transmitted to the bearing 24 and the rod 16 through the bracing rod 25, thus leaving the control action of the valve by the pedal 19 completely unaffected by such movements, and affording a safe and positive control of the valve at all times.

Figs. 2 to 5 illustrate the details of construction of a preferred embodiment of the invention. In this case, the shaft of the valve 10 is not directly connected with a pivoting arm or lever 13, as shown in Fig. 1, but through an intermediate link 28. The bearing 24, as shown in Fig. 1, in this case consists of the almost completely circular end portion 24′ of the plate spring 26, the rod 16 being snapped into such bearing by bending back the outer end thereof and being securely held therein by the combined action of such spring and, if necessary, an additional coil spring 28′ secured at the bearing 23. Bracing rod 25 is securely soldered or welded to the spring bearing 24′ and mounted on the shaft 12 of the lever 13 by means of an intermediate rubber socket 30 in the joint 29.

Inserted in a recess in the gas pedal 19 is a strip of sheet metal 31 which is bent at its upper end to form an eye 18′ in which the angularly bent lower end 18 of the crank or lever 17 is pivotally mounted. The lower end of the metal strip 31 forms another eye 20 which is guided in a vertical direction between brackets or guides 20′ on the floor plate 22 and may have a certain amount of resilience. The effect of the spring 21, as shown in Fig. 1, is in this case replaced by the weight of the gas pedal 19. A suitable gasket 33 may be provided in the front wall 32 of the car body to pass the lever therethrough.

Although in this embodiment of the invention the position of the bearing 23 supporting the rod 16 through the rubber socket 23′ does not coincide with the ideal position 23″ in the vertical plane $m$—$m$ of the pedal 19, such deviation is so small and only of such size that the relative movements between the engine and the car body will not cause any appreciable effect.

In the modification of the bearing 24, as shown in Fig. 6, the rod 25 is secured to a spring bearing 26′ which, in turn, is mounted by means of a strip of rubber 34 to the wall of the car body.

Finally, in the modification of the bearing 24, as shown in Fig. 7, the rod 25 terminates in a hooked portion 25′ which is inserted, and locked by a cotter pin, in a double bent portion projecting from the part 24′.

While in the foregoing description I have set forth in detail what I regard as the preferred embodiment of my invention, it is to be understood that numerous changes may be made without departing from the scope of the invention as defined in the appended claims. For example, the relative position of the individual elements, including the bearings 23 and 24, may be reversed. Also, when in the above description it has been spoken of mounting certain elements on the car body, that term should be understood to include parts of the car frame or other parts connected to the car body.

Having thus described my invention, what I claim as new is:

1. In combination with an automobile having a body portion constituting a first vehicle part, an engine constituting a second vehicle part resiliently mounted relative to said body portion and including a control element for controlling the operation of said engine, means for actuating said control element comprising an operating element, a first lever on one of said elements for varying the control position thereof, a second lever in spaced relation to said first lever, a third lever connected to the other element, a connecting member connected to said second lever and to said first lever and extending in the direction of the rotary axis of at least one of said first two mentioned levers, a connecting rod between said second and third levers for transmitting a movement in a predetermined direction between said second lever and said third lever, mounting means for rotatably mounting said connecting member near said first lever so as to be relatively inflexible in said predetermined direction of movement, mounting means for rotatably mounting said connecting member near said second lever to resiliently support said connecting member in said predetermined direction of movement near said second lever relative to one of said two vehicle parts, and bracing means near said second lever intermediate said connecting member and the other of said two vehicle parts for substantially rigidly linking together said second mentioned mounting means with said other vehicle part substantially in said predetermined direction of movement.

2. A combination as defined in claim 1, wherein said mounting means for rotatably mounting the connecting member comprises a slightly resilient bearing adjacent said first lever, said bearing providing a limited pivotal movement of said connecting member with said bearing about an axis perpendicular to such first axis.

3. A combination as defined in claim 1, wherein said first and second levers as well as the connecting member consist of a single rod.

4. A combination as defined in claim 1, wherein said bracing means consists of a rod which together with said connecting rod and said second and third levers substantially form a parallelogram.

5. A combination as defined in claim 1, further comprising resilient material interposed between members of said actuating means for interrupting the metallic connections between said control element and said operating element.

6. A combination as defined in claim 1, wherein said second-mentioned mounting means comprises a bearing near said second lever, and a resilient member connecting said bearing with said body portion to provide resilient movements of said bearing relative to said body portion and in the said predetermined direction of movement.

7. A combination as defined in claim 1, wherein said mounting means comprises a resilient S-shaped member near the second lever for connecting the connecting member with the body portion, said S-shaped member substantially enclosing said connecting member, said connecting member being inserted in said resilient member by bending back said resilient member, said resilient member providing resilient movements of said connecting member relative to said body portion and in the said direction of movement.

8. In combination with an automobile having a body portion constituting a first vehicle part, an engine constituting a second vehicle part resiliently mounted relative to said body portion and including a control element on said engine for controlling the operation thereof, means for actuating said control element comprising an operating element on said body portion, an adjusting member on said engine and connected to said control element, a first lever mounted on the body portion and connected to the operating element, a connecting member connected to said first lever and extending in the direction of the rotary axis of said first lever, a second lever on the connecting member and in spaced relation to the first lever, a connecting rod intermediate the second lever and said control element for transmitting a movement in a predetermined direction from the second lever to said control element, mounting means for rotatably mounting said connecting member on said body portion so as to be relatively inflexible near said first lever in said predetermined direction of movement, and so as to be resilient in said predetermined direction of movement near said second lever relative to said body portion, and bracing means near said second lever intermediate said engine and said connecting member for substantially rigidly linking together said connecting member with said motor substantially in said predetermined direction of movement.

9. A combination as defined in claim 8, wherein said operating element consists of a fourth lever which is pivotally connected to said first lever so that both said levers pivot within the same plane, and wherein the mounting means for rotatably mounting the connecting member comprise a bearing adjacent the first lever and lying substantially within said vertical plane of the operating element.

10. A combination as defined in claim 8, wherein said operating element comprises a fourth lever, means for pivotally connecting said fourth lever with said first lever, said pivotal means having an axis substantially parallel with the rotary axis of said connecting member and being located at one end of said operating element, the other end of said operating element being slidably supported by said body portion so as to be movable thereon in a plane perpendicular to said axes.

References Cited in the file of this patent

UNITED STATES PATENTS

| | | |
|---|---|---|
| 101,308 | Powell | Mar. 29, 1870 |
| 1,331,408 | Ault et al. | Feb. 17, 1920 |
| 1,385,213 | Kline | July 19, 1921 |
| 1,465,400 | Linck | Aug. 21, 1923 |
| 1,492,449 | Gramelspacher | Apr. 29, 1924 |
| 1,523,176 | Cubbage | Jan. 13, 1925 |
| 1,536,775 | Conwell | May 5, 1925 |
| 1,669,699 | Edwards | May 15, 1928 |
| 1,729,926 | Brusselbach | Oct. 1, 1929 |
| 1,795,600 | Halley | Mar. 10, 1931 |
| 1,862,453 | Bailey | June 7, 1932 |
| 2,055,279 | D'Aubarede | Sept. 22, 1936 |
| 2,063,063 | Trott et al. | Dec. 8, 1936 |
| 2,254,786 | Snyder | Sept. 2, 1941 |
| 2,312,274 | Stortz | Feb. 23, 1943 |
| 2,489,727 | Shipley | Nov. 29, 1949 |

FOREIGN PATENTS

| | | |
|---|---|---|
| 634,886 | France | Mar. 1, 1928 |
| 458,211 | Great Britain | Dec. 15, 1936 |
| 562,752 | Great Britain | July 14, 1944 |